United States Patent [19]
Puyplat

[11] 3,870,876
[45] Mar. 11, 1975

[54] MOTOR VEHICLE HEADLAMP
[75] Inventor: Olivier Puyplat, Bobigny, France
[73] Assignee: Cibie Projecteurs, Bobigny, France
[22] Filed: Oct. 18, 1973
[21] Appl. No.: 407,745

[30] Foreign Application Priority Data
Oct. 25, 1972 France .............................. 72.37832

[52] U.S. Cl. ...... 240/41 R, 240/7.1 R, 240/41.35 A, 240/41.6
[51] Int. Cl. .................................................. F21m
[58] Field of Search ......... 240/41 R, 41 B, 41.35 A, 240/41.6, 61.8, 7.1 R

[56] References Cited
UNITED STATES PATENTS

| | | | |
|---|---|---|---|
| 1,214,583 | 2/1917 | Persons ...................... | 240/41.35 A |
| 1,666,151 | 4/1928 | Stiert .......................... | 240/41.35 A |
| 1,676,393 | 7/1928 | Kisecker ...................... | 240/41.6 |
| 3,622,778 | 11/1971 | Cibie ............................ | 240/44 X |

*Primary Examiner*—Richard L. Moses
*Attorney, Agent, or Firm*—Breitenfeld & Levine

[57] ABSTRACT

A vehicle headlamp includes a main reflector with a first light source. Mounted in the main reflector is a secondary reflector and secondary light source. The mounting comprises a rigid pivotal connection.

8 Claims, 5 Drawing Figures

PATENTED MAR 11 1975 3,870,876

MOTOR VEHICLE HEADLAMP

This invention relates to motor vehicle headlamps of a type including first and second light sources.

It is conventional practice for motor vehicles to be provided with headlamps which afford either a main beam or a dipped beam. Some of these provide a main reflector for the first light source and secondary reflector disposed inside the main reflector for the second light source. The invention is concerned with improvements and methods of adjustment of the secondary light source and/or its reflector. In French Pat. No. 1511607 owned by the Assignee of the present application, it has been proposed to have a pivotal connection between the secondary and main reflectors provided with two deformable connecting elements, which allow some angular movement between the reflectors.

It is an object of the present invention to provide an improved form of headlamp construction which can be cheaply and easily manufactured and in which a secondary reflector is easily mounted and kept in a stable position.

According to the present invention, a motor vehicle headlamp comprises a first light source disposed within a main reflector, a second light source, together with an associated second reflector, positioned within the main reflector and connected thereto by a pivotal connection comprising rigid cooperating arcuate abutment surfaces disposed at least one on each reflector, and readily releasable means for maintaining the abutment surfaces in contact. By virtue of this type of construction, the axis of the pivotal connection can be held stable so as to prevent movement of the secondary reflector with respect to the main reflector irrespective of vibration of the vehicle in which the headlamp is mounted.

According to a preferred feature, at least one abutment surface is formed by a projection from the surface of one reflector, which projection is semi-cylindrical in vertical cross section. The secondary reflector and projection are preferably integrally moulded of plastics material.

According to another embodiment, two abutment surfaces are provided on the secondary reflector which are afforded by a pair of horizontally spaced, part-spherical, projections. The readily releasable means may comprise a resilient member mounted on the secondary reflector and deformable to enable it to be passed through an aperture in the main reflector.

The invention may be carried into practice in various ways but two specific embodiments will now be described, by way of example, with reference to the accompanying drawings, in which.

Figure 1:
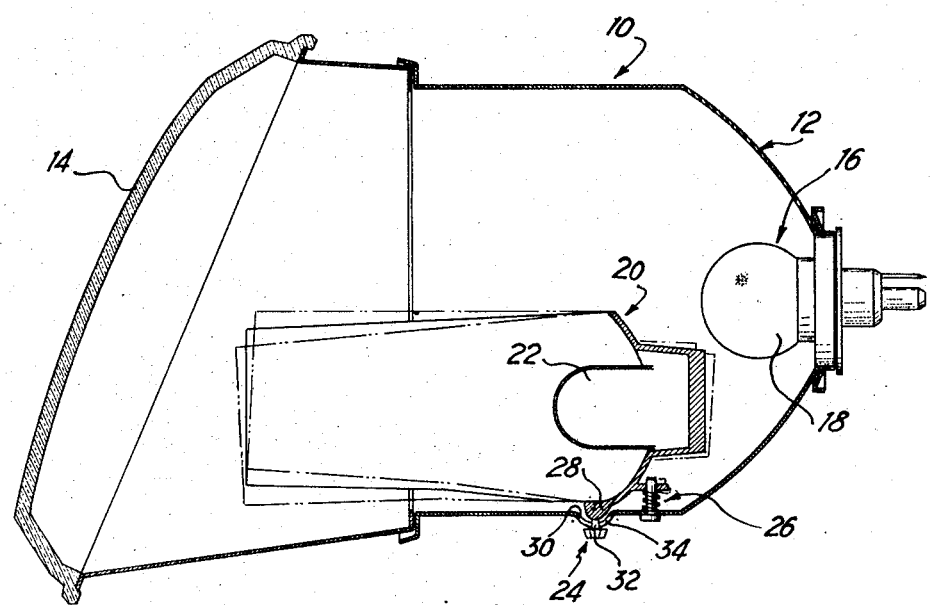
FIG. 1 is a longitudinal cross-section through one embodiment of headlamp according to the invention.
Figure 2:
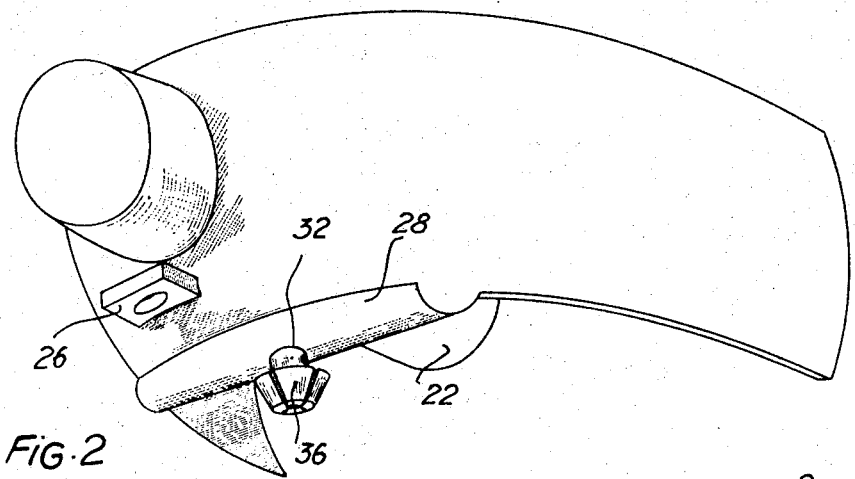
FIG. 2 is a perspective view from below and the rear of a secondary reflector disposed in the headlamp in FIG. 1.
Figure 3:
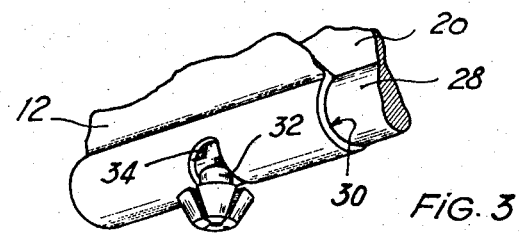
FIG. 3 is a perspective view partly cut away, illustrating a device for securing the secondary reflector on the main reflector.

In FIGS. 1 to 3, a motor vehicle headlamp 10 is shown which includes a metal casing 12 internally defining the main parabolic reflector of the headlamp, a front lens 14 suitably secured to the casing 12, and a light source 16 comprising a single-filament lamp 18 secured in known manner to the casing 12. The assembly comprising the casing 12, the lens 14 and the source 16 forms an independent unit, or sealed-beam unit, adapted to be adjustably secured in a suitable aperture or headlamp shell provided in the vehicle body, (not shown).

The headlamp 10 also includes a second parabolic reflector or secondary reflector 20 which is disposed inside the main reflector 12 and associated with a second light source 22.

The reflector 20 is secured to the bottom of reflector 12 by a pivot connection 24, the angular position of the axis of the secondary reflector 20 with respect to the axis of the main reflector 12 being adjusted by means of an adjustable-length screw-threaded connection 26 provided between the reflectors 12 and 20.

As described in greater detail in the aforementioned French Pat. No. 1511607, the dipping beam of the headlamp is obtained from the source 22 alone in cooperation with the secondary reflector 20, whereas the main beam is obtained from both sources 16 and 22.

The pivoting connection 24, in this embodiment is defined by the cooperation of a semi-cylindrical projection 28 with a corresponding semi-cylindrical abutment surface formed by a recess 30 in the bottom of the main reflector 12. The axis of the pivoting connection 24 thus defined by the generatrix of the semi-cylindrical projection 28 is horizontal and perpendicular to the axis of the main reflector 12.

In order to retain the projection 28 in a predetermined axial position in the recess 30, the projection 28 has a radially extedning peg 32 which cooperates with a corresponding semi-annular slot 34 in the recess 30. The free end of the peg 32 has an expanded head 36 which is formed of resilient material which can be elastically deformed so as to be force-fitted or snapped through the slot 34 with which it forms a press-button securing device which, although not shown as a tight-fit in FIG. 3 in practice is a tight fit and prevents the projection 28 from moving in a radial direction with respect to the abutment surface formed by recess 30.

The aforementioned feature provides a simple method of securing the secondary reflector 20 to the main reflector 12, while allowing the reflector 20 to pivot on the reflector 12 around a relatively stationary horizontal axis. The pivoting connection 24 is very stable in the longitudinal direction. The reflector 20, the projection 28 and the radial peg 32 ending in the head 36 are made simply and cheaply by moulding.

Figure 4:
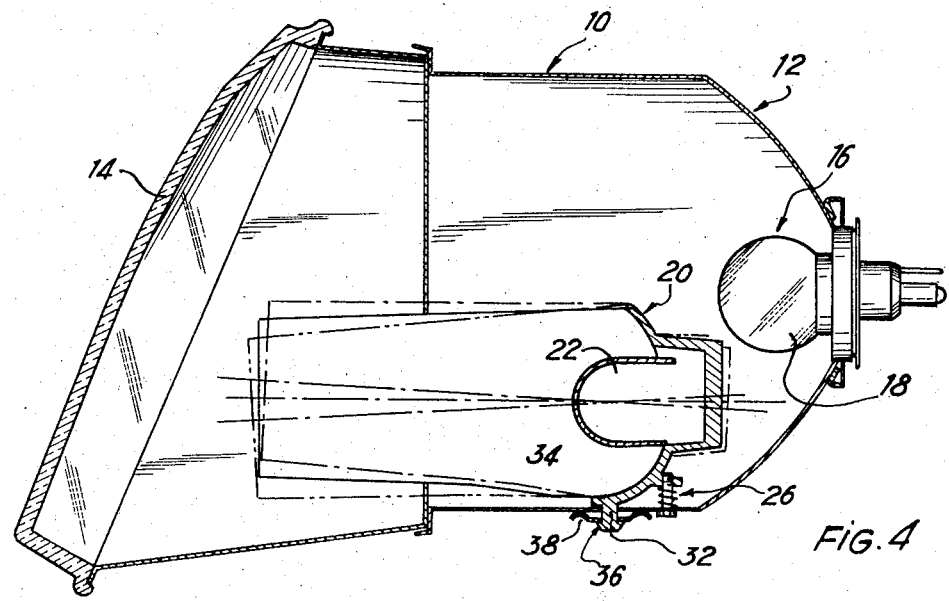
FIG. 4 is a longitudinal section through another embodiment of a headlamp according to the invention.
Figure 5:
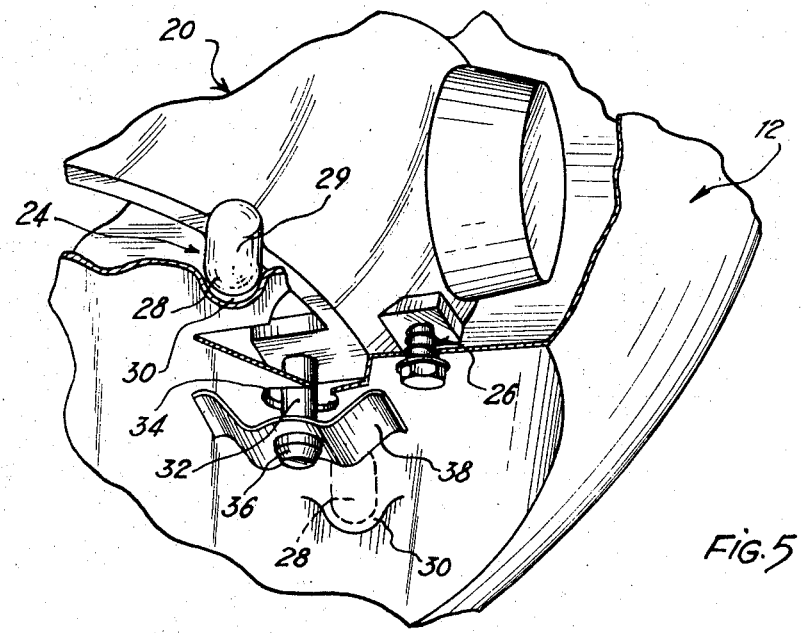
FIG. 5 is a perspective view partly cut away, showing the pivoting connection between the two reflectors of the headlamp in FIG. 4.

In the embodiment shown in FIGS. 4 and 5, the pivoting connection 24 between the reflectors 12 and 20 is defined by two substantially spherical projections 28 (see FIG. 5) formed by the lower ends of two components 29 moulded in one piece with the plastics secondary reflector 20, in cooperation with two corresponding spherical abutment surfaces formed by two recesses 30 in the bottom of the main reflector 12.

The projections 28 are held against the abutment surfaces of the recesses 30 by a resilient clip 38 such as a U-shaped spring strip compressed between the main reflector 12 and the free end or expanded head 36 of a radial peg 32 extending through an aperture 34 in the wall of the reflector 12. The central part of the strip 38 is mounted on the peg 32 by a snap-fitting.

The invention is not limited to the embodiments described and shown, and numerous modifications can be made thereto without departing from the scope of the present application. More particularly, the protuberance 28 can be formed in the bottom (or top) of the reflector 12, in which case recess 30 will of course be made in the reflector 20. The retaining device formed by peg 32 in cooperation with the slot 34 could be replaced by any other suitable prior-art device adapted to prevent any axial or radial movement of the projection 28 with respect to recess 30.

What we claim as our invention and desire to secure by Letters Patent is:

1. A motor vehicle headlamp comprising:
   a first light source disposed within a main parabolic reflector,
   a secondary parabolic reflector, together with a second light source disposed therewithin, positioned within the main reflector,
   a pivotal connection provided between the secondary and main reflectors for allowing relative angular displacement therebetween, said pivotal connection comprising cooperating arcuate abutment surfaces, at least one of which is disposed on each reflector,
   readily releasable means for maintaining said cooperating abutment surfaces in contact, and
   an adjustment device for controlling the relative angular displacement of the secondary reflector with respect to the main reflector.

2. A motor vehicle headlamp as claimed in claim 1, in which one of the cooperating abutment surfaces if formed by a semi-cylindrical projection extending from and integral with the secondary reflector, the other abutment surface being formed by a corresponding semi-cylindrical recess provided in the main reflector.

3. A motor vehicle headlamp as claimed in claim 2, in which said projection is provided with a radially extending stud projecting through an aperture in the main reflector.

4. A motor vehicle headlamp as claimed in claim 3, in which the readily releasable means comprises a resilient head provided on the end of the stud and adapted to be resiliently forced through the aperture in the main reflector.

5. A motor vehicle headlamp as claimed in claim 1, in which the readily releasable means comprises a resilient member mounted on the second reflector, said member being deformable to enable it to be passed through an aperture in the main reflector.

6. A motor vehicle headlamp as claimed in claim 1 including a pair of spaced, part-spherical projections on the secondary reflector, each projection presenting an arcuate abutment surface.

7. A motor vehicle headlamp as claimed in claim 6, in which the secondary reflector is provided between the projections with a stud extending through an aperture in the main reflector.

8. A motor vehicle headlamp as claimed in claim 7, in which the readily releasable means comprises a resilient member removably secured to the outer end of the stud and adapted to engage an outer surface of the main reflector.

* * * * *